(12) United States Patent
Brown, Sr.

(10) Patent No.: US 9,585,522 B1
(45) Date of Patent: Mar. 7, 2017

(54) PORTABLE HAND WASHING STATION

(71) Applicant: Tyrone Brown, Sr., Lincoln, CA (US)

(72) Inventor: Tyrone Brown, Sr., Lincoln, CA (US)

( * ) Notice: Subject to any disclaimer, the term of this patent is extended or adjusted under 35 U.S.C. 154(b) by 61 days.

(21) Appl. No.: 14/752,405

(22) Filed: Jun. 26, 2015

(51) Int. Cl.
| *A47K 1/00* | (2006.01) |
| *A47K 1/02* | (2006.01) |
| *B62B 3/04* | (2006.01) |
| *B62B 3/02* | (2006.01) |
| *B60R 9/02* | (2006.01) |

(52) U.S. Cl.
CPC ............... *A47K 1/02* (2013.01); *B60R 9/02* (2013.01); *B62B 3/02* (2013.01); *B62B 3/04* (2013.01)

(58) Field of Classification Search
CPC . A47K 1/02; A47K 1/09; A47K 10/22; A47K 10/40; A47K 10/405; A47K 2010/3233; A47K 2010/389
USPC .... 220/522, 592.02–592.05, 592.08, 592.18; 242/598.3, 598.5, 599.1; 280/47.18, 280/47.26, 831, 836, 838–839; 4/62–628, 4/630, 638, 654, 661; 62/457.1–457.8
See application file for complete search history.

(56) References Cited

U.S. PATENT DOCUMENTS

| 3,594,830 | A | | 7/1971 | Clifton | |
| 4,769,863 | A | | 9/1988 | Tegg et al. | |
| 6,173,458 | B1 | * | 1/2001 | Maddux | A47K 1/02 |
| | | | | | 4/619 |
| 6,305,185 | B1 | * | 10/2001 | Sloan | A45C 5/14 |
| | | | | | 62/235.1 |
| 8,113,483 | B2 | | 2/2012 | Bayley et al. | |
| 9,316,428 | B2 | * | 4/2016 | Mech | F25D 3/08 |
| 9,448,000 | B2 | * | 9/2016 | Patsis | F25D 3/08 |
| 2007/0192953 | A1 | * | 8/2007 | Hughes | A47K 1/02 |
| | | | | | 4/625 |
| 2014/0366262 | A1 | * | 12/2014 | Flynn | E03C 1/186 |
| | | | | | 4/514 |

* cited by examiner

*Primary Examiner* — Paul R Durand
*Assistant Examiner* — Nicholas Ros
(74) *Attorney, Agent, or Firm* — Stevenson IP, LLC

(57) ABSTRACT

A portable hand washing station including a wheeled cart for traversing a variety of terrain, a hinged lid, a reservoir for storing fluid therein, and a spigot on a front side of the cart for dispensing liquid, such as water or sanitizing fluid, from the reservoir. At least one solar panel with at least one rechargeable battery is provided along with at least one universal serial bus (USB) port for charging items such as a cell phone. At least one wireless speaker is disposed on the cart. A handle having a cross-member, which doubles as a paper towel holder, is disposed on the outer wall of the lid. A telescopic dowel, which slidingly engages the cross-member, serves as a light holder. Outer storage pouches are disposed on the cart.

8 Claims, 4 Drawing Sheets

PORTABLE HAND WASHING STATION

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various portable sink devices are known in the prior art. However, what is needed is a portable hand washing station that includes a wheeled cart for traversing a variety of terrain, a hinged lid of the cart, a reservoir within the cart, a spigot on a front side of the cart for dispensing liquid from the reservoir, at least one solar panel with rechargeable batteries and at least one universal serial bus (USB) port for charging items such as wireless speakers, a telescopic light holder, storage pouches on the outer wall of the cart, and a handle, which doubles as a paper towel roll holder, on an outer wall of the lid. The present portable hand washing station addresses the foregoing needs.

FIELD OF THE INVENTION

The present invention relates to portable sink devices, and more particularly, to a portable hand washing station.

SUMMARY OF THE INVENTION

The general purpose of the portable hand washing station, described subsequently in greater detail, is to provide a portable hand washing station which has many novel features that result in a portable hand washing station which is not anticipated, rendered obvious, suggested, or even implied by prior art, either alone or in combination thereof. Thus, the present portable hand washing station includes a wheeled cart with a continuous interior compartment and a hingedly attached lid, which has an upper perimeter and a lower perimeter. A plurality of latches lockably engages each of the upper perimeter proximal a front side of the cart to the lower perimeter and the lower perimeter to the cart front side. A reservoir, provided to store an amount of liquid such as water or sanitizing fluid, is continuously disposed within the entire interior compartment. A spigot, disposed on the cart front side, is in fluid communication with the reservoir to dispense the liquid thereby permitting the washing of an individual's hands or other items, such as dishes.

A pair of identical support arms vertically disposed on the external wall of the lid atop a platform and a hollow cylindrical cross-member disposed between the support arms provide to provide a handle and alternately a paper towel holder. A cylindrical dowel, which slidingly engages the entire cross-member, has a forward end extendible from the cross-member. A lockable pivot member is disposed approximately midway between the forward end and a rearward end of the dowel. The pivot member is pivotable from an initial position parallel to the external wall of the lid to an upright position perpendicular to the external wall. A light holder removably engages the forward end when the forward end is extended from the cross-member. The pivot member permits the light holder to vertically display a light thereon.

A solar panel is disposed on the internal wall of at least one of the upper perimeter and the lower perimeter of the lid. A rechargeable battery is in operational communication with each solar panel. At least one universal serial bus ("USB") port and at least one wireless speaker are disposed on the lower perimeter and are in operational communication with each solar panel.

A plurality of storage pouches is disposed on the cart to accommodate the storage of items, such as napkins, paper plates, plastic dining utensils, and other items commonly associated with outdoor camping. A concave notch is disposed on each of the right side and the left side proximal each of the bottom side and the rear side. A wheel rotatingly engages the cart within each concave notch.

Thus has been broadly outlined the more important features of the present portable hand washing station so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
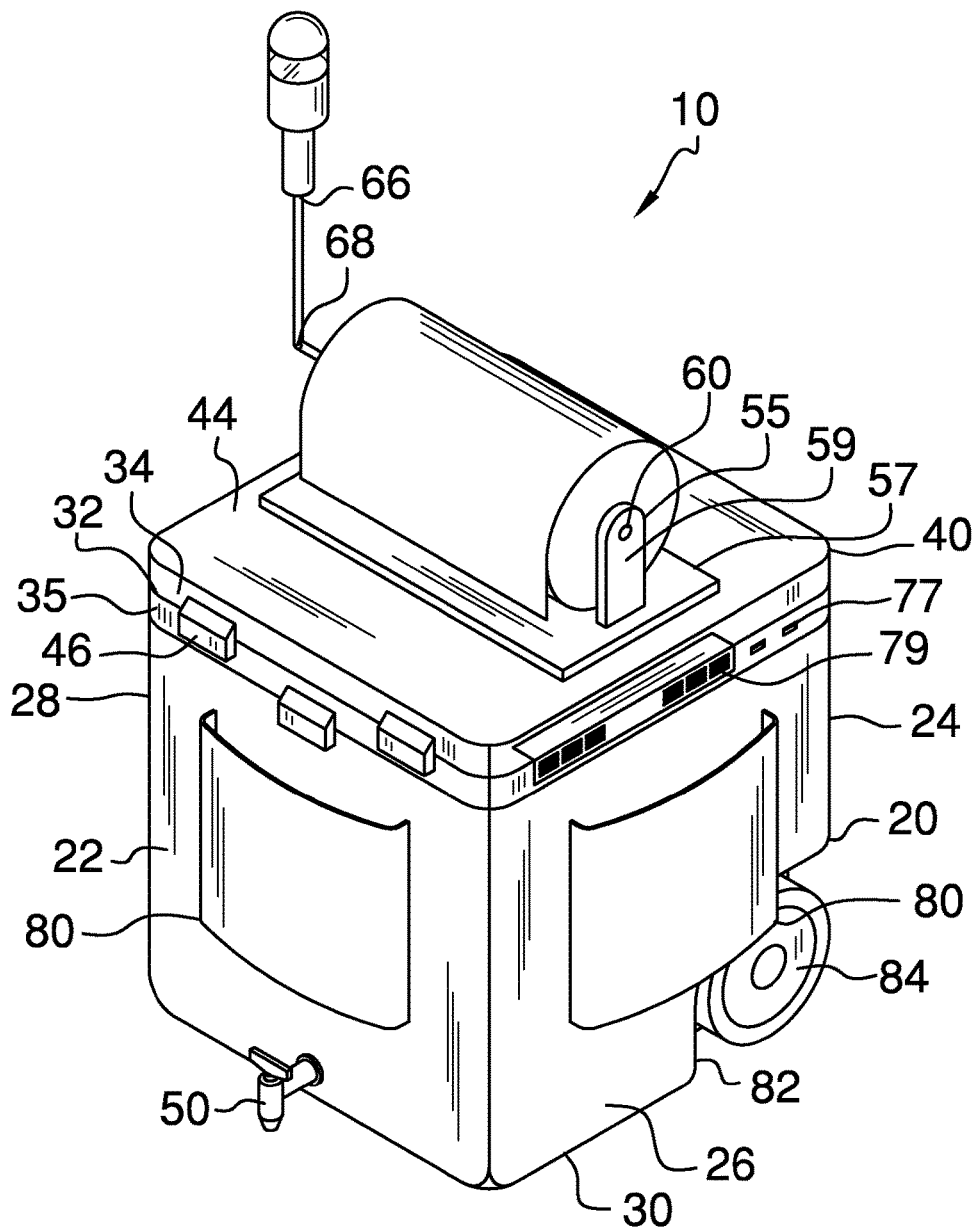
FIG. 1 is an isometric view with a lid in a closed position.
Figure 2:
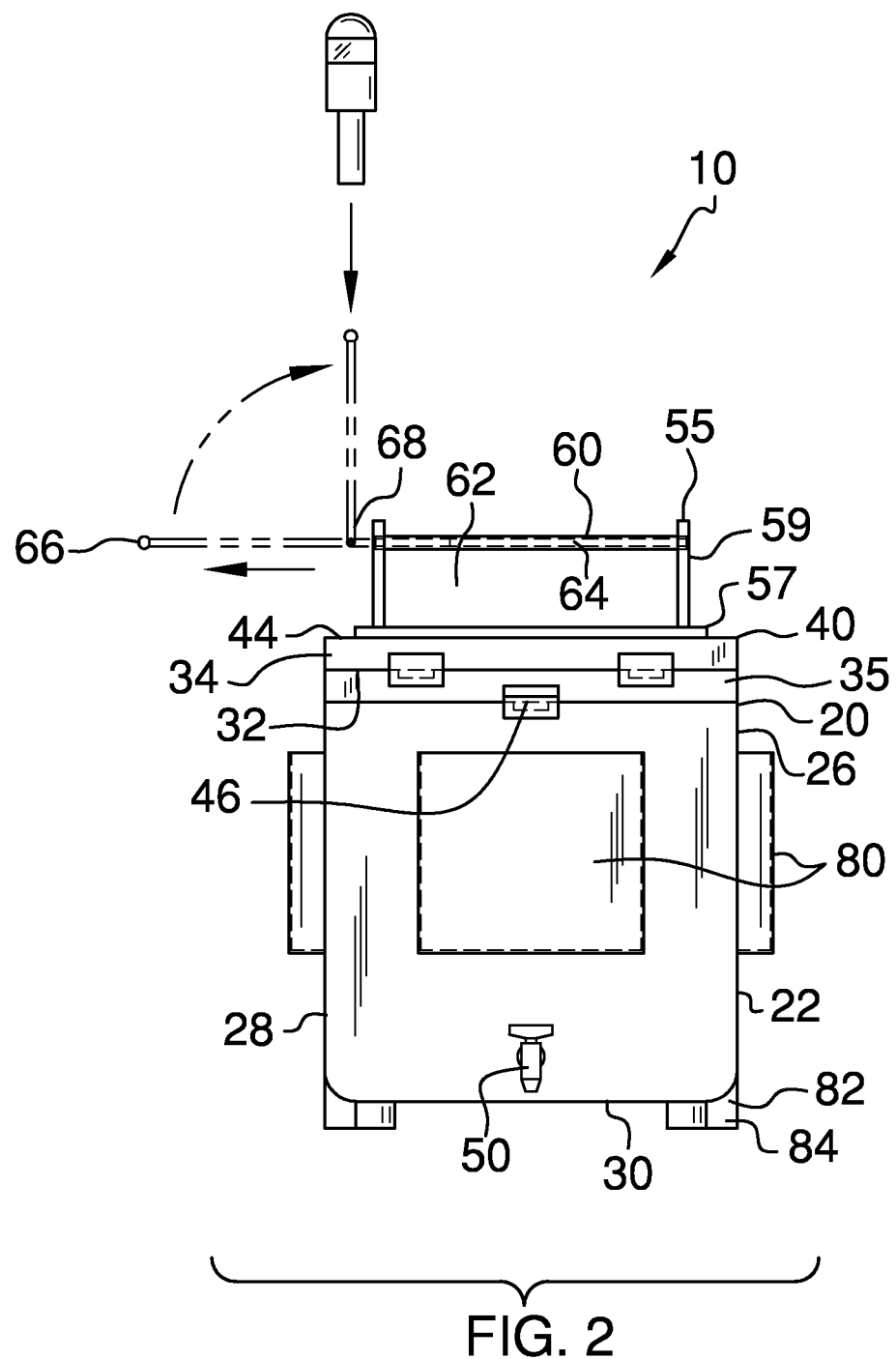
FIG. 2 is a front elevation view showing the telescopic nature of a light holder.
Figure 3:
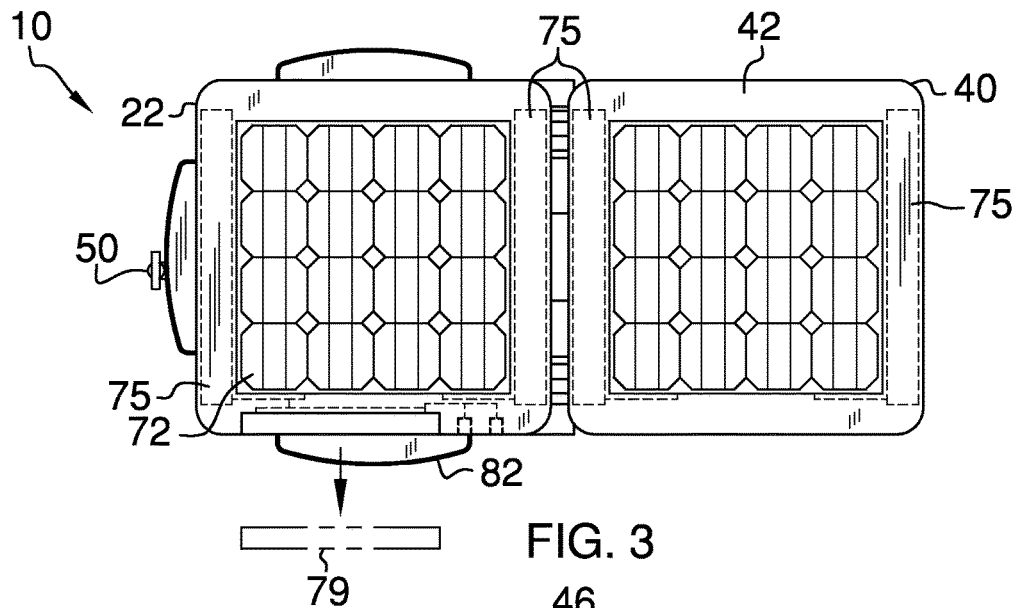
FIG. 3 is a top plan view with the lid in an open position showing at least one solar panel disposed within the lid.
Figure 4:
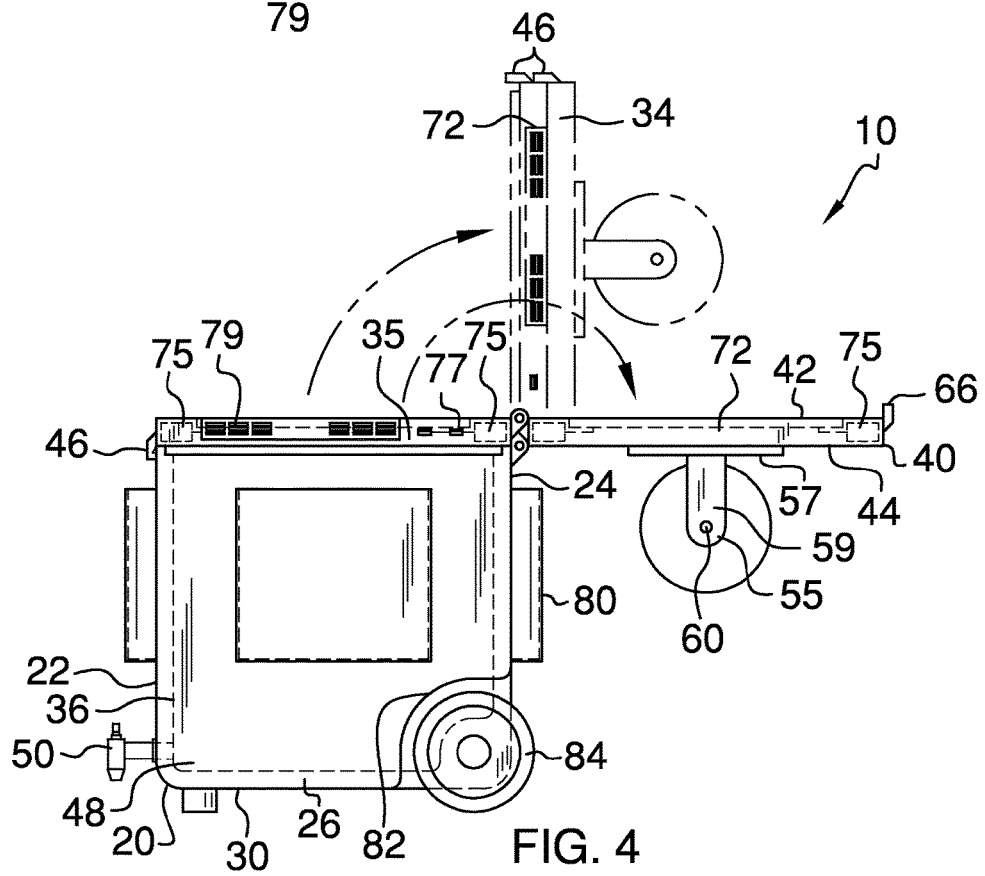
FIG. 4 is a right side elevation view with the lid in the open position showing a wireless speaker and at least one USB port disposed within an upper perimeter of the cart.
Figure 5:
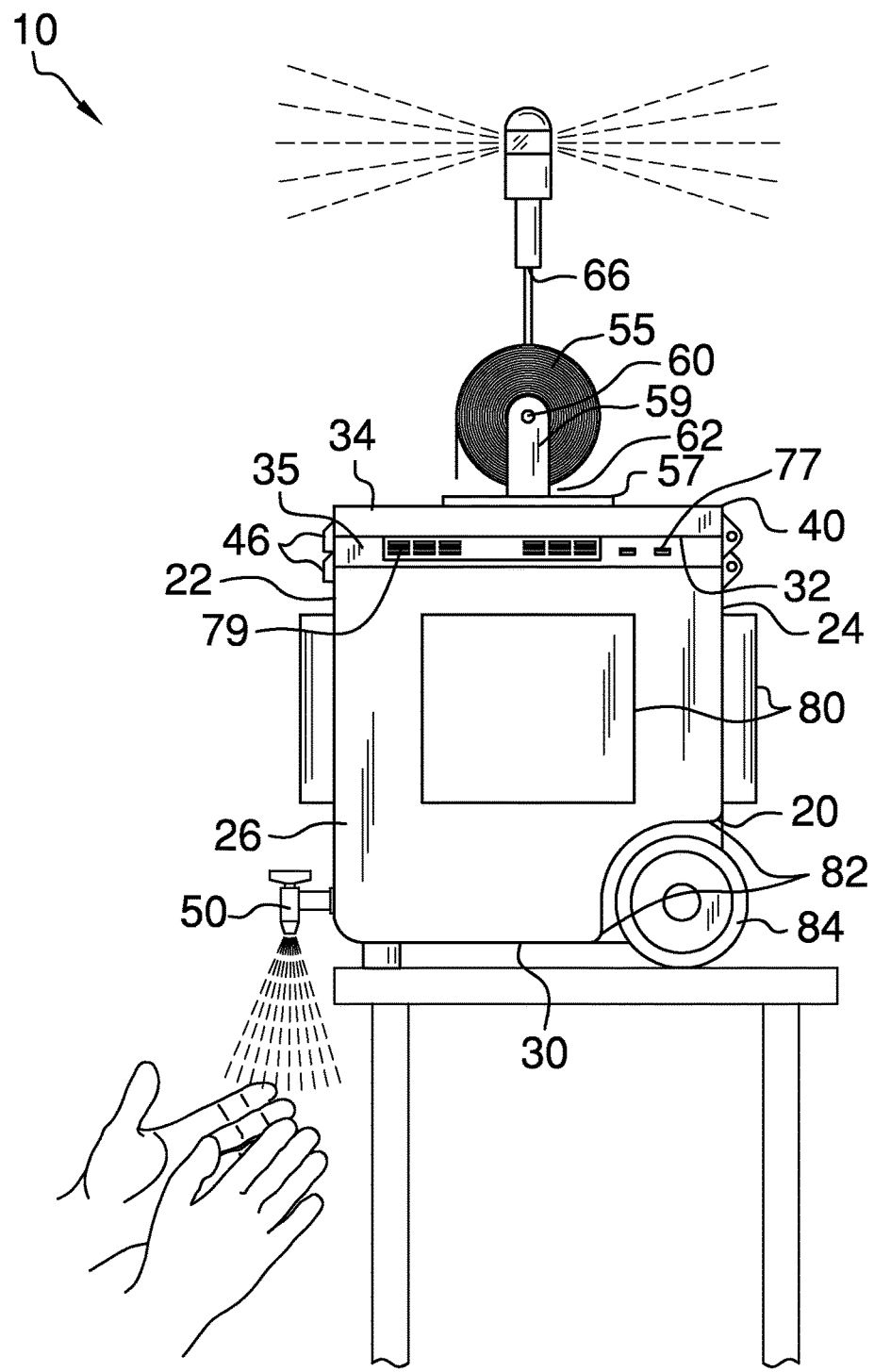
FIG. 5 is an in-use right side elevation view disposed atop a surface showing a liquid being dispensed from a spigot and an illuminated light disposed on the light holder.

With reference now to the drawings, and in particular FIGS. 1 through 5 thereof, the instant portable hand washing station designated by the reference number 10 will be described. The present portable hand washing station 10 includes a wheeled cart 20 having a front side 22, a rear side 24, a right side 26, a left side 28, a bottom side 30, an open top side 32. The cart 20 has an interior compartment 36 defined by the front and rear sides 22, 24, the right and left sides 26, 28, the bottom side 30, and the top side 32. A lid 40 is disposed atop the cart 20. The lid 40 has an upper perimeter 34 and a lower perimeter 35, each of the upper and lower perimeters 34, 35 having internal wall 42 and an external wall 44. The lid 40 is hingedly attached to the rear side 24 of the cart 20. A plurality of latches 46 lockably engages each of the upper perimeter 34 proximal the front side 22 to the lower perimeter 35 and the lower perimeter 35 to the cart 20 front side 22. Thus, the lid 40 is movable from a closed position directly adjacent the upper perimeter 34 to an open position.

A reservoir 48 is continuously disposed within the entire interior compartment 36. A spigot 50 is disposed on the cart 20 front side 22 and is in fluid communication with the reservoir 48. The reservoir 48 is configured to store an amount of liquid such as water or sanitizing fluid, which is dispensed through the spigot to permit washing of an individual's hands or other items, such as dishes.

A pair of identical support arms 55 is vertically disposed on the external wall 44 of the lid 40 atop a platform 57. Each support arm 55 has an exterior wall 59 parallel to the respective right side 26 and left side 28 of the cart 20 when the lid 40 is in the closed position. A hollow cylindrical cross-member 60 is removably disposed between the support arms 55 and spaced apart from the external wall 44 by a gap 62 and in a position parallel to the external wall 44. The gap 62 between the cross-member 60 and the external wall 44 is configured to permit a user to grasp the cross-member 60 with the user's fingers in the gap 62 for use of the cross-member 60 as a handle and further to permit a full paper towel roll mounted on the cross-member 60 to pass between the cross-member 60 and the external wall 44 so that the paper towel roll is rotatable.

A cylindrical telescopic dowel 64 slidingly engages the entire cross-member 60. The dowel has a forward end 66. A lockable pivot member 68 is disposed approximately midway between the forward end 66 and a rearward end 70 of the dowel 66. The pivot member 68 is pivotable from an initial position parallel to the external wall 44 of the lid 40 to an upright position perpendicular to the external wall 44. A light holder 70 removably engages the forward end 66 when the forward end 66 is extended from the cross-member 60. The pivot member 68 permits the light holder 70 to vertically display a light thereon.

A solar panel 72 is disposed on the internal wall 42 of at least one of the upper perimeter 34 and the lower perimeter 35 of the lid 40. A rechargeable battery 75 is in operational communication with each solar panel 75. At least one universal serial bus ("USB") port 77 is disposed on the lower perimeter 35. At least one wireless speaker 79 is also removably disposed on the lower perimeter 35. Each of the at least one USB port 77 and the at least one wireless speaker 79 is in operational communication with each solar panel 72.

A plurality of storage pouches 80 is disposed on the cart 20. At least one storage pouch 80 is disposed on at least one of the front side 22, the rear side 24, the right side 26, and the left side 28 of the cart 20. The storage pouches 80 are provided to accommodate the storage of items, such as napkins, paper plates, plastic dining utensils, and other items commonly associated with outdoor camping.

A concave notch 82 is disposed on each of the right side 26 and the left side 28 proximal each of the bottom side 30 and the rear side 24. A wheel 84 rotatingly engages the cart 20 within each concave notch 82.

What is claimed is:

1. A portable hand washing station comprising:
    a wheeled cart having a front side, a rear side, a right side, a left side, a bottom side, an open top side having a continuous upper perimeter, and an interior compartment defined by the front and rear sides, the right and left sides, and the bottom side, and the upper perimeter;
    a lid disposed atop the wheeled cart, the lid having an internal wall and an external wall;
    a reservoir continuously disposed within the entire interior compartment;
    a spigot disposed on the cart front side, the spigot in fluid communication with the reservoir;
    a pair of support arms vertically disposed on external wall of the lid;
    a cylindrical cross-member removably disposed between the support arms and spaced apart from the external wall by a gap and in a position parallel to the external wall;
    a cylindrical telescopic dowel slidingly engaging the entire cross-member, the dowel having a forward end extendible from the cross-member;
    a lockable pivot member disposed approximately midway between the forward end and a rearward end of the dowel, wherein the pivot member is pivotable from an initial position parallel to the external wall to an upright position perpendicular to the external wall; and
    a light holder removably engaging the forward end when the forward end is extended outside the cavity;
    wherein the reservoir is configured to store an amount of liquid therein; and
    wherein the gap between the cross-member and the external wall is configured to permit a user to grasp the cross-member with the user's fingers in the gap and further to permit a full paper towel roll to pass between the cross-member and the external wall.

2. The portable hand washing station of claim 1 comprising a solar panel disposed on the internal wall of at least one of the upper perimeter and the lower perimeter of the lid;
    a rechargeable battery in operational communication with the at least one solar panel;
    at least one universal serial bus ("USB") port disposed on the lower perimeter of the cart top side; and
    at least one wireless speaker removably disposed on the lower perimeter of the cart top side;
    the at least one USB port and the at least one wireless speaker in operational communication with the at least one solar panel.

3. The portable hand washing station of claim 2 comprising a plurality of storage pouches disposed on the cart.

4. The portable hand washing station of claim 3 wherein at least one storage pouch is disposed on at least one of the front side, the rear side, the right side, and the left side of the cart.

5. The portable hand washing station of claim 4 wherein the lid is hingedly attached to the rear side of the cart.

6. The portable hand washing station of claim 5 further comprising:
    a concave notch disposed on each of the right side and the left side proximal each of the bottom side and the rear side; and
    a wheel rotatingly engaging the cart within each concave notch.

7. The portable hand washing station of claim 6 further comprising:
    a plurality of latches lockably engaging each of the upper perimeter proximal the front side to lower perimeter and the lower perimeter to the cart front side.

8. A portable hand washing station comprising:
    a wheeled cart having a front side, a rear side, a right side, a left side, a bottom side, an open top side having a continuous upper perimeter, and an interior compartment defined by the front and rear sides, the right and left sides, and the bottom side, and the upper perimeter;
    a lid disposed atop the wheeled cart, the lid having an upper perimeter and a lower perimeter, each of the upper and lower perimeters having an internal wall and an external wall, wherein the lid is hingedly attached to the rear side of the cart;
    a plurality of latches lockably engaging each of the upper perimeter proximal the front side to lower perimeter and the lower perimeter to the cart front side;

a reservoir continuously disposed within the entire interior compartment;

a spigot disposed on the cart front side, the spigot in fluid communication with the reservoir;

a pair of identical support arms vertically disposed on a platform disposed on the external wall of the lid, each support arm having an exterior wall parallel to the respective right side and left side of the cart when the lid is in the closed position;

a cylindrical cross-member removably disposed between the support arms and spaced apart from the external wall by a gap and in a position parallel to the external wall;

a cylindrical dowel slidingly engaging the entire cross-member, the dowel having a forward end extendible from the cross-member;

a lockable pivot member disposed approximately midway between the forward end and a rearward end of the dowel, wherein the pivot member is pivotable from an initial position parallel to the external wall to an upright position perpendicular to the external wall;

a solar panel disposed on the internal wall of each of the upper perimeter and the lower perimeter of the lid;

a rechargeable battery in operational communication with each solar panel;

at least one universal serial bus ("USB") port disposed on the lower perimeter of the cart top side;

at least one wireless speaker removably disposed on the lower perimeter of the cart top side, the at least one USB port and the at least one wireless speaker in operational communication with the at least one solar panel;

a light holder removably engaging the forward end when the forward end is extended outside the cavity;

wherein the reservoir is configured to store an amount of liquid therein;

wherein the gap between the cross-member and the external wall is configured to permit a user to grasp the cross-member with the user's fingers in the gap and further to permit a full paper towel roll to pass between the cross-member and the external wall;

a plurality of storage pouches disposed on the cart, wherein at least one storage pouch is disposed on at least one of the front side, the rear side, the right side, and the left side of the cart;

a concave notch disposed on each of the right side and the left side proximal each of the bottom side and the rear side; and a wheel rotatingly engaging the cart within each concave notch.

\* \* \* \* \*